United States Patent [19]

Ide et al.

[11] Patent Number: 4,930,320

[45] Date of Patent: Jun. 5, 1990

[54] COOLING FAN CONTROLLING APPARATUS FOR VEHICLE WITH AIR CONDITIONER

[75] Inventors: Yutaka Ide; Makoto Hasiguchi, both of Wako, Japan

[73] Assignee: Honda Giken Kogyo Kabushiki Kaisha, Tokyo, Japan

[21] Appl. No.: 348,923

[22] Filed: May 8, 1989

[30] Foreign Application Priority Data

May 16, 1988 [JP] Japan ............................... 63-118968

[51] Int. Cl.$^5$ ............................................ F25B 39/04
[52] U.S. Cl. ...................................... 62/184; 62/181; 62/228.5
[58] Field of Search .................... 62/181, 183, 228.4, 62/228.5, 180, 184, 196.2, 510, DIG. 17

[56] References Cited

U.S. PATENT DOCUMENTS

| | | |
|---|---|---|
| 2,718,119 | 9/1955 | Prince .................................... 62/181 |
| 3,390,539 | 7/1968 | Miner ............................. 62/DIG. 17 |
| 3,633,376 | 1/1972 | Miner .................................... 62/181 |
| 4,364,237 | 12/1982 | Cooper et al. .................... 62/181 X |

Primary Examiner—Harry B. Tanner
Attorney, Agent, or Firm—Armstrong, Nikaido, Marmelstein, Kubovcik & Murray

[57] ABSTRACT

A cooling-fan controlling apparatus for an air conditioner system including a variable volume compressor, including a work-performed detecting device for detecting the work performed by the variable volume compressor, a discharge-pressure detecting device for detecting the pressure discharged from said compressor, and a controller for controlling the drive speed of a cooling fan on the basis of both the values detected in said work-performed detecting device and said discharge pressure detecting device.

6 Claims, 3 Drawing Sheets

COOLING FAN CONTROLLING APPARATUS FOR VEHICLE WITH AIR CONDITIONER

BACKGROUND OF THE INVENTION

The present invention relates to an air conditioner system for a vehicle, and particularly, to an apparatus for controlling a cooling fan of a condenser in an air conditioner system including a variable volume or displacement compressor.

In general, a condenser and a radiator are disposed side by side in an air conditioner system for a vehicle and cooled by air flow produced by a common fan driven by an electric motor and by relative air flow produced by forward motion of the vehicle.

The control of operation of the cooling fan is required to be conducted on the basis of the demand of both the air conditioner system including the condenser and the engine including the radiator. One example of such controlling device is known from Japanese Patent Application Laid-open No. 67918/83.

This controlling device comprises a heat-sensitive switch adapted to be operated when the temperature of the cooling water in the radiator exceeds a predetermined level, and a pressure-sensitive switch adapted to be operated when the pressure of a refrigerant in the condenser exceeds a predetermined level, so that the operation of either one of the heat-sensitive and pressure-sensitive switches causes the cooling fan to be started, thereby preventing the over-heating of the engine and/or the over-load of the compressor.

When a variable volume or displacement compressor is used as the compressor of the air conditioner system, the control of the cooling fan suitable for the actual load of the variable volume compressor cannot be performed. It is difficult to maintain the temperature of the refrigerant at an appropriate value merely by using only the pressure of the refrigerant as the detected variable to produce a detection signal on the air conditioner system side as in the above prior art control apparatus.

The present invention has been accomplished with the above circumstances in view. It is an object to provide a cooling-fan controlling apparatus capable of driving a cooling fan in accordance with a value of the actual load of a variable volume compressor.

SUMMARY OF THE INVENTION:

To solve the above object, a first feature of the present invention resides in a cooling-fan controlling apparatus for an air conditioner system including a variable volume compressor, comprising work-performed or work volume detecting means for detecting the work-performed or work volume of a variable volume compressor, and control means for controlling the drive speed of a cooling fan on the basis of the value detected in the work-performed detecting means.

In addition, a second feature of the present invention resides in a cooling-fan controlling apparatus for an air conditioner system including a variable volume compressor, comprising work-performed detecting means for detecting the work performed by a variable volume compressor, discharge-pressure detecting means for detecting the pressure discharged from the compressor, and control means for controlling the drive speed of a cooling fan on the basis of both the values detected in the work-performed detecting means and the discharge-pressure detecting means.

According to the first feature of the present invention having the above construction, the magnitude of the actual load of the variable volume compressor which is in operation is indirectly detected by the work-performed detecting means, and the temperature of a refrigerant is maintained at an appropriate value by controlling the drive speed of the cooling fan in accordance with such detected value by the control means.

In addition, according to the second feature of the present invention, the pressure of refrigerant discharged is detected in addition to the work performed, and on the basis of both of the detected values, the drive speed of the cooling fan is controlled. Therefore, the temperature can be maintained at a further appropriate value.

BRIEF DESCRIPTION OF THE DRAWINGS:

The above and other objects and the attendant advantages of the present invention will become readily apparent by reference to the following detailed description when considered in conjunction with the accompanying drawings wherein.

DETAILED DESCRIPTION OF PREFERRED EMBODIMENT:

One embodiment of a cooling-fan controlling apparatus according to the present invention will now be described with reference to the accompanying drawings.

Figure 1:
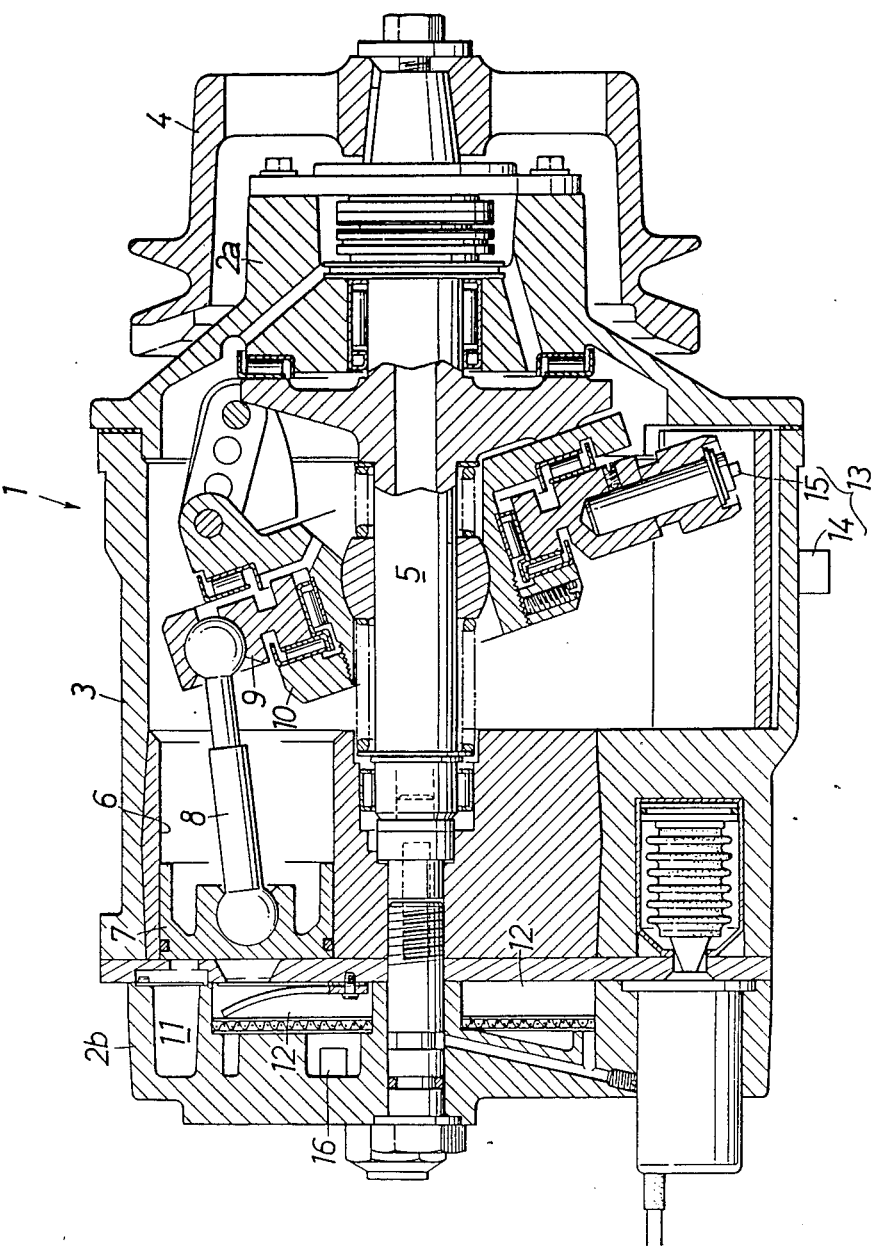
FIG. 1 is a view of the entire variable volume compressor provided with a cooling-fan controlling apparatus according to one embodiment of the present invention.

FIG. 1 illustrates a variable volume compressor used for compressing a refrigerant for an air conditioner system.

The variable volume compressor 1 is of an axial piston type. A generally cylindrical housing 3 is closed at its opposite ends with covers 2a and 2b. A driving shaft 5 rotatably driven through a pulley 4 mounted on an end thereof projecting from one of the covers 2a is coaxially, rotatably mounted in the housing 3. A piston 7 is slidably received in the corresponding one of a plurality of cylinder bores 6 disposed around the driving shaft 5. A swashplate 9 is connected to each of the pistons through a connecting rod 8. A holder 10 is pivotally disposed for swinging movement about an axis perpendicular to an axis of the driving shaft 5 and supports the swashplate 9 with relative rotation therebetween. The other cover 2b for the housing 3 is provided with an intake chamber and a discharge chamber 12 which communicate with each cylinder bore 6.

In the variable volume compressor 1 composed in the manner, if the driving shaft 5 is driven for rotation by a driving source (not shown) through the pulley 4, the holder 10 is rotated in unison with the driving shaft 5. The swashplate 9 supported on the holder 10 for relative rotation but for inhibited rotation is reciprocatingly swung. Thereupon, each piston 7 connected to the swashplate 9 through the connecting rod 8 reciprocates through the cylinder bore 6, thereby compressing the refrigerant drawn from the intake chamber 11 into the cylinder bore 6 to deliver it into the discharge chamber 12. The compressor 1 is conventionally known and hence, the detailed description thereof is omitted.

The amount of work performed by the variable volume compressor 1, i.e., the quantity of refrigerant discharged is determined by the angle of inclination of the swashplate 9 and by the number of rotations of the drive shaft 5. As the angle of inclination of the swashplate 9 increases, the stroke of the piston 7 increases to increase the discharged quantity, and with increasing of the number of rotations, the number of strokes of the piston 7 per unit time increases to increase the discharged quantity. A work-performed detecting means 13 mounted on the variable volume compressor 1 will be described below.

As shown in FIG. 1, the variable volume compressor 1 includes work-performed detecting means 13 comprising an electromagnetic induction type detector 14 mounted on an outer surface of the housing 3, and a pin 15 as an object to be detected which is mounted on the swashplate 9 at a place opposed to the electro-magnetic induction type detector 14. The electro-magnetic induction type detector 14 produces a pulse every time when the pin 15 passes through the vicinity of the electro-magnetic induction type detector 14 by the reciprocal swinging movement of the swashplate 9 with the rotation of the driving shaft 5. Thus, it is possible to determine the number of rotations of the driving shaft 5 by detecting the number and interval of pulses outputted from the electro-magnetic induction type detector and to calculate the amount of work-performed of the variable volume compressor 1

Specifically, the swashplate 9 performs its swinging movement of one reciprocation with every rotation of the driving shaft 5 and hence, the electro-magnetic induction type detector 14 produces two pulses. Accordingly, the number of rotations of the driving shaft 5 can be determined by counting the number of pulses outputted per unit time. When the angle of inclination of the swashplate 9 is close to zero, the interval between pulses outputted is even or uniform. However, when the angle of inclination of the swashplate 9 is increased, the center about which the swashplate 9 swings is offset in one direction and hence, the outputting of pulses is at uneven intervals. Therefore, the angle of inclination of the swashsplate 9 can be determined by detecting the intervals of the pulses outputted.

Further, in addition to the above-described work-performed detecting means 13, the variable volume compressor 1 includes means 16 for detecting the pressure of refrigerant discharged, within the discharge chamber 12. The work-performed detecting means 13 and the discharge-pressure detecting means 16 are connected to an electronic controller 17 which will be described and which serves as means for controlling a cooling fan.

Figure 2:
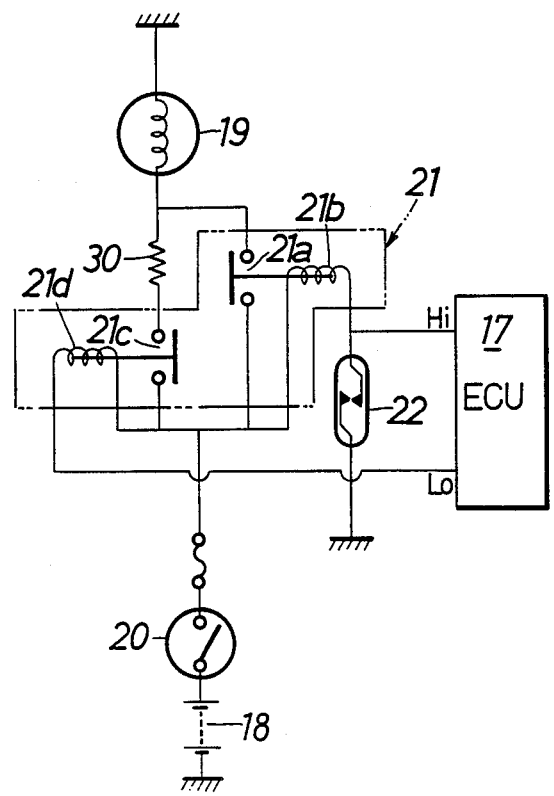
FIG. 2 illustrates a cooling-fan driving circuit.

FIG. 2 illustrates a cooling-fan driving circuit, and as clearly seen in FIG. 2, an ignition switch 20 and a relay contact 21a of a relay 21 are interposed in series between a battery 18 and a cooling fan 19. A thermo-switch 22 for detecting the temperature of the cooling water for the engine is connected to a coil 21b of the relay contact 21a. If the temperature of the cooling water increases beyond a predetermined value while the ignition switch 20 is closed, the thermo-switch 22 is closed to excite the coil 21b, so that the relay contact 21a is closed to start the cooling fan 19.

The electronic controller 17 is connected to the cooling-fan driving circuit at a position between the coil 21b and the thermo-switch 22 for providing a control based on demand of the air conditioner system side in addition to the control of the cooling fan 19 based on the temperature of the cooling water for the engine,.

A series circuit comprising a resistor 30 and a relay contact 21c of the relay 21 is connected parallel to the relay contact 21a, and the electronic controller 17 is connected to a coil 21d of the relay contact 21c. The electronic controller 17 can excite the coil 21a or coil 21b in an alternative manner when the thermoswitch 22 is open. When the coil 21b is excited to let the relay contact 21a be closed, the cooling fan 19 is driven to rotate at a high speed whereas when the coil 21d is excited to let the relay contact 21c be closed, the fan 19 is driven to rotate at a low speed. Specifically, the speed of rotation of the cooling fan 19 can be changed over between high and low levels under control of the electronic controller 17.

Figure 3:
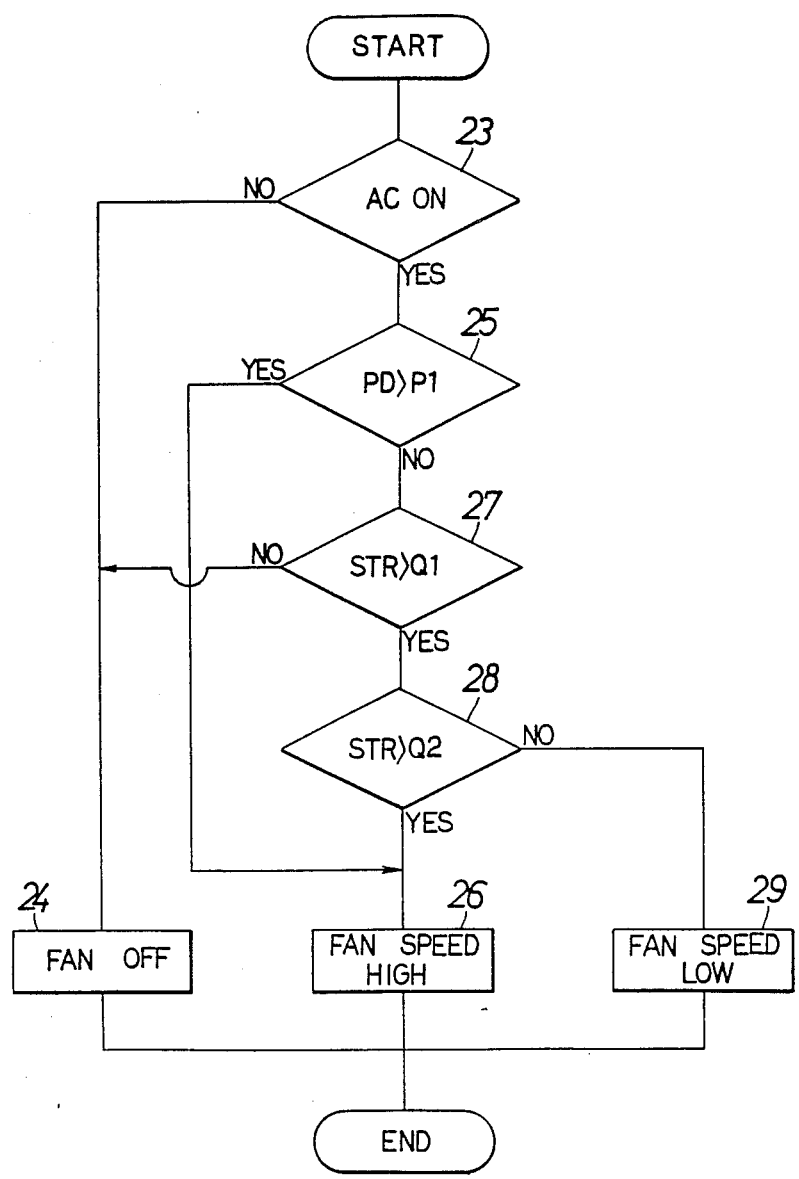
FIG. 3 is a flow chart illustrating the operation of the controlling apparatus.

The operation of this embodiment of the cooling-fan controlling apparatus having the above-described construction will be described below on the basis of a flow chart in FIG. 3 illustrating the operation of the electronic controller 17.

First, at a step 23, it is judged whether or not the air conditioner system AC is in operation. If NO, the cooling fan 19 is not driven at a step 24. If YES at the step 23, it is judged at a step 25 whether or not the value (PD) detected in the refrigerant discharge-pressure detecting means 16 exceeds a predetermined reference value (PI). If YES, the variable volume compressor 1 is regarded to be in a higher load condition and the cooling fan 19 is operated in a higher speed mode at a step 26.

If NO at the step 25, it is further decided whether or not the value (STR) detected in the work-performed detecting means 13 is larger than a predetermined lower limit value (Q1) at a step 27. If NO, the compressor 1 is regarded to be in a lower load condition and the cooling fan 19 is stopped at the step 24. On the other hand, if YES at the step 27, it is further decided at a step 28 whether or not the value (STR) detected in the work-performed detecting means 13 is larger than a predetermined upper limit value (Q2). If NO, the compressor 1 is regarded to be in a medium load condition and the cooling fan 19 is operated in a lower speed mode at a step 29. On the other hand, if YES at the step 28, the compressor 1 is regarded to be in a high load condition and the cooling fan 19 is operated in the higher speed mode at the step 26.

The subject matter of controlling of the cooling fan 19 by the electronic controller 17 is summarized as follows: If the pressure of refrigerant discharged is larger than the reference value Pl, the cooling fan 19 is operated in the higher speed mode, irrespective of the work performed of the variable volume compressor 1. If such pressure is smaller than the reference value P1, the work performed is further referred to. If the work performed is smaller than the lower limit value Q1, the cooling fan 19 is stopped. If the work performed is between the lower limit value Q1 and the upper limit value Q2, the cooling fan 19 is operated in the lower speed mode. If the work performed is larger than the upper limit value Q2, the cooling fan 19 is operated in the higher speed mode. Accordingly, the condenser receives a cooling air suitable for the load determined by the discharge pressure from and the work performed of the variable volume compressor, so that the heat exchange in the condenser is conducted in an optimal condition.

The embodiment of the cooling-fan controlling apparatus according to the present invention has been described above, but it will be understood that the present invention is not intended to be limited to the above-described embodiment, and various modifications in minor design can be made without departing from the scope of the invention described in claims.

For example, the work performed can be detected on the basis of the quantity of refrigerant discharged from the compressor, in place of detection thereof on the basis of the number of rotations of the driving shaft and the angle of inclination of the swashplate. In addition, the cooling fan can be continuously controlled in proportion to the magnitude of the work performed of the variable volume compressor, in place of controlling thereof into the three stages cf the stoppage, the lower speed mode and the higher speed mode.

According to the first feature of the cooling-fan controlling apparatus of the present invention, the work performed by the variable volume compressor is selected as a parameter representative of the actual load of the variable volume compressor, and the drive speed of the cooling fan is controlled on the basis of the value of this work, so that the heat exchange in the condenser is carried out in an optimal condition in accordance with the load value of the variable volume compressor. Therefore, it is possible not only to provide the efficient operation of the variable compressor at a proper temperature, but also to prevent any ineffective operation of the cooling fan, thereby preventing any noise and providing a retrenchment of the battery.

In addition, according to the second feature of the present invention, it is possible to perform the heat exchange in the condenser in a further proper condition by further accurately grasping the actual load of the variable volume compressor from two parameters: the work performed and the discharge pressure.

It is readily apparent that the above-described has the advantage of wide commercial utility. It should be understood that the specific form of the invention hereinabove described is intended to be representative only, as certain modifications within the scope of these teachings will be apparent to those skilled in the art.

Accordingly, reference should be made to the following claims in determining the full scope of the invention.

What is claimed is:

1. A cooling-fan controlling apparatus for an air conditioner system including a variable volume compressor, comprising:
   work-performed detecting means for detecting the work performed by the variable volume compressor;
   a condenser;
   a cooling fan for cooling said condenser; and
   a control means for controlling the drive speed of said cooling fan on the basis of the value detected in said work performed detecting means.

2. The apparatus as set forth in claim 1 wherein said work performed by the variable volume compressor is represented by a quantity of refrigerant discharged from the compressor.

3. The apparatus as set forth in claim 2, wherein said variable volume compressor is of a swashplate-type having a swashplate and said quantity of refrigerant discharged is determined by an angle of inclination of said swashplate and a number of rotations of a drive shaft for the swashplate.

4. A cooling-fan controlling apparatus for an air conditioner system including a variable volume compressor, comprising:
   work-performed detecting means for detecting the work performed by the variable volume compressor;
   a condenser;
   a cooling fan for cooling said condenser;
   discharge-pressure detecting means for detecting the pressure discharged from said compressor; and
   control means for controlling the drive speed of said cooling fan on the basis of both the values detected in said workperformed detecting means and said discharged pressure detecting means.

5. The apparatus as set forth in claim 4 wherein said work performed by the variable volume compressor is represented by a quantity of refrigerant discharged from the compressor.

6. The apparatus as set forth in claim 5, wherein said variable volume compressor is of a swashplate type having a swashplate and said quantity of refrigerant discharged is determined by an angle of inclination of said swashplate and a number of rotation of a drive shaft for the swashplate.

* * * * *